US012753005B2

(12) United States Patent
Bäuerle et al.

(10) Patent No.: US 12,753,005 B2
(45) Date of Patent: Oct. 6, 2026

(54) RECEPTACLE GROUPING SYSTEM AND METHOD FOR OPERATING A RECEPTACLE GROUPING SYSTEM

(71) Applicant: Syntegon Technology GmbH, Waiblingen (DE)

(72) Inventors: Johannes Bäuerle, Obersontheim (DE); Matthias Schwandt, Wallhausen (DE); Sebastian Gran, Crailsheim (DE)

(73) Assignee: Syntegon Technology GmbH, Waiblingen (DE)

( * ) Notice: Subject to any disclaimer, the term of this patent is extended or adjusted under 35 U.S.C. 154(b) by 394 days.

(21) Appl. No.: 18/411,394

(22) Filed: Jan. 12, 2024

(65) Prior Publication Data

US 2024/0239601 A1 Jul. 18, 2024

(30) Foreign Application Priority Data

Jan. 13, 2023 (DE) ..................... 10 2023 100 776.9

(51) Int. Cl.
*B65G 1/04* (2006.01)
*A61J 1/00* (2023.01)
*B65G 54/02* (2006.01)

(52) U.S. Cl.
CPC *B65G 1/04* (2013.01); *A61J 1/00* (2013.01); *B65G 54/02* (2013.01)

(58) Field of Classification Search
CPC .............. A61J 1/00; B65G 1/04; B65G 54/02
See application file for complete search history.

(56) References Cited

U.S. PATENT DOCUMENTS 10,011,430 B2 * 7/2018 Mäder .................. B65G 17/326
10,829,252 B2 * 11/2020 Trilli ..................... B65B 55/027
(Continued)

FOREIGN PATENT DOCUMENTS

DE 19920494 A1 6/2000
DE 102018219083 A1 5/2020
WO 2020243814 A1 12/2020

OTHER PUBLICATIONS

European Patent Office Extended Search Report for U.S. Appl. No. 24/150,730 dated Jun. 11, 2024 (23 pages including English machine translation).

(Continued)

*Primary Examiner* — Eyamindae C Jallow
(74) *Attorney, Agent, or Firm* — Michael Best & Friedrich LLP

(57) ABSTRACT

A receptacle grouping system (10) includes a stock storage device (14), receptacles (12, 18) being arranged in the stock storage device in a delivery configuration in which different sub-quantities of the receptacles have a first distance (32) from each other that corresponds to the delivery configuration, further including a transport device (83) for transporting receptacles, arranged in a receptacle carrier (22), along a transport path, the receptacles being arranged in the receptacle carrier in a machine configuration in which the different sub-quantities of receptacles have a second distance (88) from each other that corresponds to the machine configuration and that is different from the first distance corresponding to the delivery configuration, and there being provided, as viewed along the transport path, at least one loading area (64) having a loading device (66) for loading the receptacle carrier with unfilled receptacles and/or for unloading filled receptacles from the receptacle carrier.

12 Claims, 8 Drawing Sheets

(56) References Cited

U.S. PATENT DOCUMENTS

| | | | | |
|---|---|---|---|---|
| 12,024,322 | B2 * | 7/2024 | Anatrini | B65B 43/46 |
| 2013/0015108 | A1 | 1/2013 | Krauss et al. | |
| 2018/0229866 | A1 * | 8/2018 | Eberhardt | B65B 65/003 |
| 2022/0009723 | A1 | 1/2022 | Schuesslburner | |
| 2022/0212883 | A1 * | 7/2022 | Lu | B65B 57/16 |
| 2022/0250859 | A1 | 8/2022 | Rajabi | |
| 2022/0383690 | A1 * | 12/2022 | Zou | A21B 1/48 |

OTHER PUBLICATIONS

German Patent Office Action for Application No. 102023100776.9 dated Oct. 30, 2023 (16 pages including English translation).

* cited by examiner

RECEPTACLE GROUPING SYSTEM AND METHOD FOR OPERATING A RECEPTACLE GROUPING SYSTEM

BACKGROUND

The invention relates to a receptacle grouping system, comprising a stock storage device, unfilled receptacles being arranged in the stock storage device in a delivery configuration in which different sub-quantities of receptacles have a first distance from each other that corresponds to the delivery configuration, further comprising a transport device for transporting receptacles, arranged in a receptacle carrier, along a transport path, the receptacles being arranged in the receptacle carrier in a machine configuration in which the different sub-quantities of receptacles have a second distance from each other that corresponds to the machine configuration and that is different from the first distance corresponding to the delivery configuration, and there being provided, as viewed along the transport path, at least one loading area having a loading device for loading the receptacle carrier with unfilled receptacles and/or for unloading filled receptacles from the receptacle carrier.

In the case of such receptacle grouping systems, in order to load the receptacle carrier it is necessary to convert the unfilled receptacles, following their removal from the stock storage device, from the delivery configuration to the machine configuration. In addition, the receptacles, after having been filled, are unloaded from the receptacle carrier and preferably supplied to a stock container. It is often necessary in this case for the receptacles to be converted from the machine configuration back to the delivery configuration.

In the case of known receptacle grouping systems, the receptacles, for the purpose of converting the configuration, are picked up singly or as a (small) sub-quantity by means of the loading device and, when being released from the loading device, are positioned, in accordance with the machine configuration or delivery configuration, into the receptacle carrier or storage container, respectively. For this purpose the loading device may be realized, for example, as a robot that picks up, holds and transports the receptacles.

A disadvantage of such receptacle grouping systems is that the loading or unloading of the receptacle carrier correlates with a multiplicity of successive loading or unloading operations.

Since the receptacles can thus only be transported singly or as a (small) sub-quantity in each case between the receptacle carrier and the receptacle stock, or the stock container, several successive transport movements of the loading device (for example, the robot) are necessary. This takes a lot of time.

SUMMARY

Proceeding from this, the invention is based on the object of specifying a more efficient receptacle grouping system.

The invention achieves this object, in the case of a receptacle grouping system of the type mentioned at the outset, in that the receptacle grouping system has a conversion device for supplying unfilled receptacles from the stock storage device into a conversion area and/or for discharging filled receptacles from the conversion area into a stock container, the receptacles being arranged in the conversion area in the delivery configuration, and the conversion area and the loading area being spaced apart from each other across at least one adaptation area, the configuration of the receptacles being alterable, between the delivery configuration and the machine configuration, in the at least one adaptation area, there being at least one stator and at least two movers, electromagnetically coupled to the stator, arranged in the at least one adaptation area, the movers being drivable to move independently of each other relative to a drive surface, and there being a receiving means, for receiving one of the sub-quantities of the receptacles, arranged on a respective upper side of a mover, the receptacles being selectively convertible to the machine configuration or to the delivery configuration by alteration of the distance between the movers.

The conversion device enables a large number of receptacles to be supplied into the conversion area, and the receptacles to be transferred to the different receiving means of the different movers.

The movers serve, on the one hand, to transport the receptacles to the loading area. On the other hand, the movement function inherent in the movers is used to easily adapt the configuration of the receptacles received in the receiving means. For this purpose, as the movers move through the at least one adaptation area, the distance between the movers changes from a first distance that is associated with the delivery configuration of the receptacles, to a second distance that is associated with the machine configuration of the receptacles.

The movers are also preferably used to transport the filled receptacles from the loading area into the conversion area. In this case too, the configuration is adapted particularly easily and simultaneously for all receptacles received in the receiving means as the movers move through the at least one adaptation area.

The invention thus allows the configuration of the receptacles to be adapted simultaneously for—in comparison with known receptacle grouping systems—an increased number of receptacles.

Particularly preferably, the receiving means together have a total number of receivers, each of which serves to receive a receptacle, this total number being at least as great as a total number of receptacle-carrier receivers of the receptacle carrier, the receptacle-carrier receivers each serving to receive one receptacle. This ensures that the receptacle carrier can be loaded with receptacles up to its maximum receiving capacity with just a single loading operation, or unloaded with just a single unloading operation.

In the case of a preferred embodiment, it is provided that the transport device comprises a transport mover that serves to transport the receptacle carrier along the transport path and that can be driven by means of the at least one stator or by means of a further stator. This provides a particularly flexible way of moving the receptacle carrier along the transport path.

Particularly preferably, the transport device comprises a plurality of receptacle carriers. This allows the receptacle grouping system to be used in a particularly efficient manner, as different operating states can be realized simultaneously. In this way, for example—while a first receptacle carrier is being loaded in the loading area—another receptacle carrier along the transport path may be located in a station for filling the receptacles.

It is further preferred that the conversion device and/or the loading device is or are drivable along a lifting axis that is perpendicular to the drive surface. This allows particularly easy loading and unloading of the receptacle carrier, as well as particularly easy receiving and removal of the receptacles from the receiving means of the movers. In particular, receptacles held on the loading device or the conversion device can be unloaded from receptacle-carrier receivers of the receptacle carrier, or removed from the receiving means of the movers, by a lifting movement of the loading device or of the conversion device. Accordingly, it is possible for the receptacles to be loaded into the receptacle-carrier receivers of the receptacle carrier, or output to the receiving means of the movers, by lowering of the loading device or the conversion device.

In particular, it is preferred that the conversion device has at least one first holding means having prongs arranged in a comb-like manner and in accordance with the delivery configuration, with mutually adjacent prongs in each case serving to receive respectively one of the sub-quantities of the receptacles. This provides a particularly simple way of receiving the receptacles in their delivery configuration into the conversion device, and holding them on the conversion device.

Furthermore, it is preferred that the conversion device has two first holding means, and that the conversion device can be driven to rotate about an axis of rotation that is perpendicular to the drive surface. This ensures the most efficient supply of unfilled receptacles and discharge of filled receptacles. For example, it is possible for one of the holding means to be arranged in the conversion area and, at the same time, for the other holding means to be arranged in the area of a receptacle stock or stock container. This makes it possible, for example, to transfer unfilled receptacles in the conversion area to the receiving devices of the movers and, at the same time, remove already filled receptacles from the other holding means and supply them to the stock container.

Particularly preferably, the loading device has a second holding means having prongs arranged in a comb-like manner and in accordance with the machine configuration, with mutually adjacent prongs in each case serving to receive respectively one of the sub-quantities of the receptacles. This provides a particularly simple way of receiving the receptacles in their machine configuration into the loading device, and holding them on the loading device.

It is particularly preferable that, as viewed along the transport path, two loading areas are provided, a first loading area being spaced apart from the conversion area across a first adaptation area, and a second loading area being spaced apart from the conversion area across a second adaptation area. Having two loading areas arranged along the transport path increases the flexibility and efficiency of the receptacle grouping system. In particular, it is possible for the receptacle carrier and the movers to be arranged in one loading area at a time. This also allows the receptacle carrier to be loaded or unloaded in particular at the same time as the receptacles are received into or output from the receiving means.

It is further preferred that the receptacles can be converted in the first adaptation area from the delivery configuration to the machine configuration, and that the receptacles can be converted in the second adaptation area from the machine configuration to the delivery configuration. Separation of the loading and unloading functions of the two loading areas is thereby achieved, with the receptacle carrier being loaded in the first loading area and unloaded in the second loading area. This separation of functions allows particularly reliable operation of the receptacle grouping system.

The object mentioned at the outset is also achieved by a method for operating a receptacle grouping system that comprises the features of the coordinate method claim.

If the receptacle grouping system has two adaptation areas and two loading areas, it is preferred that—while the receptacles in the first adaptation area are being converted from the delivery configuration to the machine configuration—filled receptacles are simultaneously unloaded from the receptacle carrier and transferred into the second loading area. Particularly efficient operation of the receptacle grouping system is thereby ensured.

BRIEF DESCRIPTION OF THE DRAWINGS

Further features and advantages are provided by the following description and the representation of embodiments in the drawings.

In the drawing

DETAILED DESCRIPTION

Figure 1:
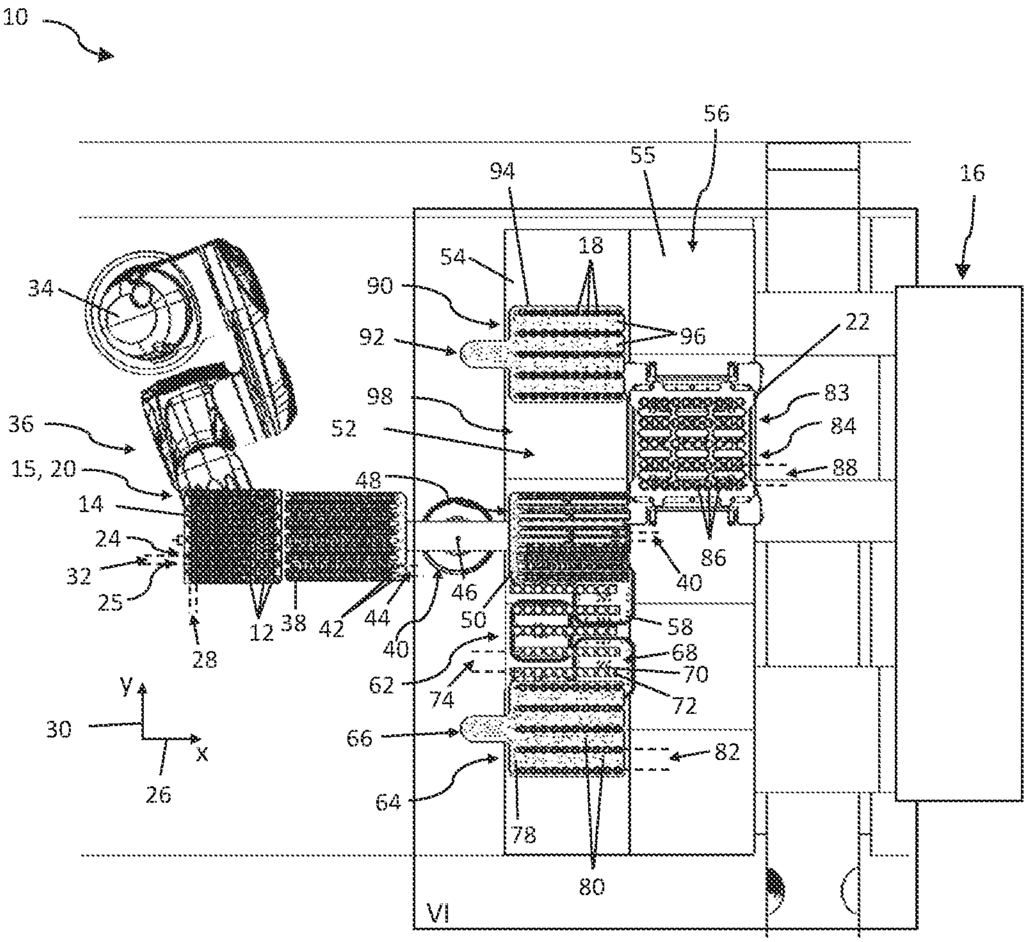
FIG. 1 shows a top view of an embodiment of a receptacle grouping system for filling a plurality of receptacles.

In the drawings, a receptacle grouping system is denoted as a whole by the reference designation 10.

The receptacle grouping system 10 is in particular part of a pharmaceutical or foodstuffs container filling system.

The receptacle grouping system 10 serves, in particular, to supply unfilled receptacles 12 from a stock storage device 14 to a filling device 16, which is known per se and is therefore represented merely schematically in the drawing. The unfilled receptacles 12 arranged in the stock storage device 14 form a receptacle stock 15. The receptacle grouping system 10 also serves to discharge receptacles 18 filled by means of the filling device 16 and to arrange them in a stock container 20. The receptacle stock 15 and the stock container 20 may alternately occupy the same position, see FIG. 1, or be arranged at different positions.

The receptacles 12, 18 are, in particular, pharmaceutical receptacles such as, for example, vials, syringes or carpules. The stock storage device 14 is, in particular, a tray or a nest. It is possible for the stock storage device 14 to form a, or the, stock container 20 for filled receptacles 18.

The receptacle grouping system has a receptacle carrier 22, which serves to receive receptacles 12 to be filled and filled receptacles 18. The receptacle carrier 22 serves to transport the receptacles 12, 18 along a transport path toward the filling device 16, or away from the filling device 16.

During operation of the receptacle grouping system 10, it is necessary to convert the arrangement (i.e., configuration of the spacing of different sub-quantities) of the receptacles 12, 18 from a delivery configuration—assigned to the stock storage device 14—to a machine configuration—assigned to the receptacle carrier 22. This machine configuration is predefined, for example, by the design of the filling device 16, which may have a multiplicity of individual, mutually spaced-apart and simultaneously operable filling stations.

The further structure and mode of operation of the receptacle grouping system 10 is explained below, starting from an initial state with unfilled receptacles 12.

In the initial state, the unfilled receptacles 12 are accommodated in the stock storage device 14, see FIG. 1. In particular, the unfilled receptacles 12 are placed on a bottom surface of the stock storage device 14 and are secured in the stock storage device 14 by means of a lateral edge. Preferably, the unfilled receptacles 12 extend upward by part of their length beyond the edge of the stock storage device 14 and have a laterally protruding receptacle collar (known per se and not represented in the drawing) at an upper end.

In the stock storage device 14, the unfilled receptacles 12 are arranged in the delivery configuration, which is characterized by a specific distance between different sub-quantities 24, 25 of the unfilled receptacles 12. For example, a first sub-quantity 24 is formed by unfilled receptacles 12 arranged along a first row. A second sub-quantity 25 is formed, for example, by unfilled receptacles 12 arranged along a second row.

Preferably, the first row and the second row are adjacent to each other. Preferably, the first row and the second row extend parallel to each other. For example, the two rows extend in an x-direction 26.

Within one of the rows, the receptacles have an offset relative to each other. It is preferred that the receptacles 12 are arranged equidistantly from each other within a row.

It is possible for the receptacles 12 of two mutually adjacent rows to be offset from each other, for example (as viewed in the x-direction 26) having an offset 28 relative to each other.

The first row and the second row have a first distance 32 relative to each other that is specific to the delivery configuration, for example in a y-direction 30.

The stock storage device 14 is preferably held on an articulated arm robot 34 and is movable within a working space 36 by means of the articulated arm robot 34.

Figure 7:
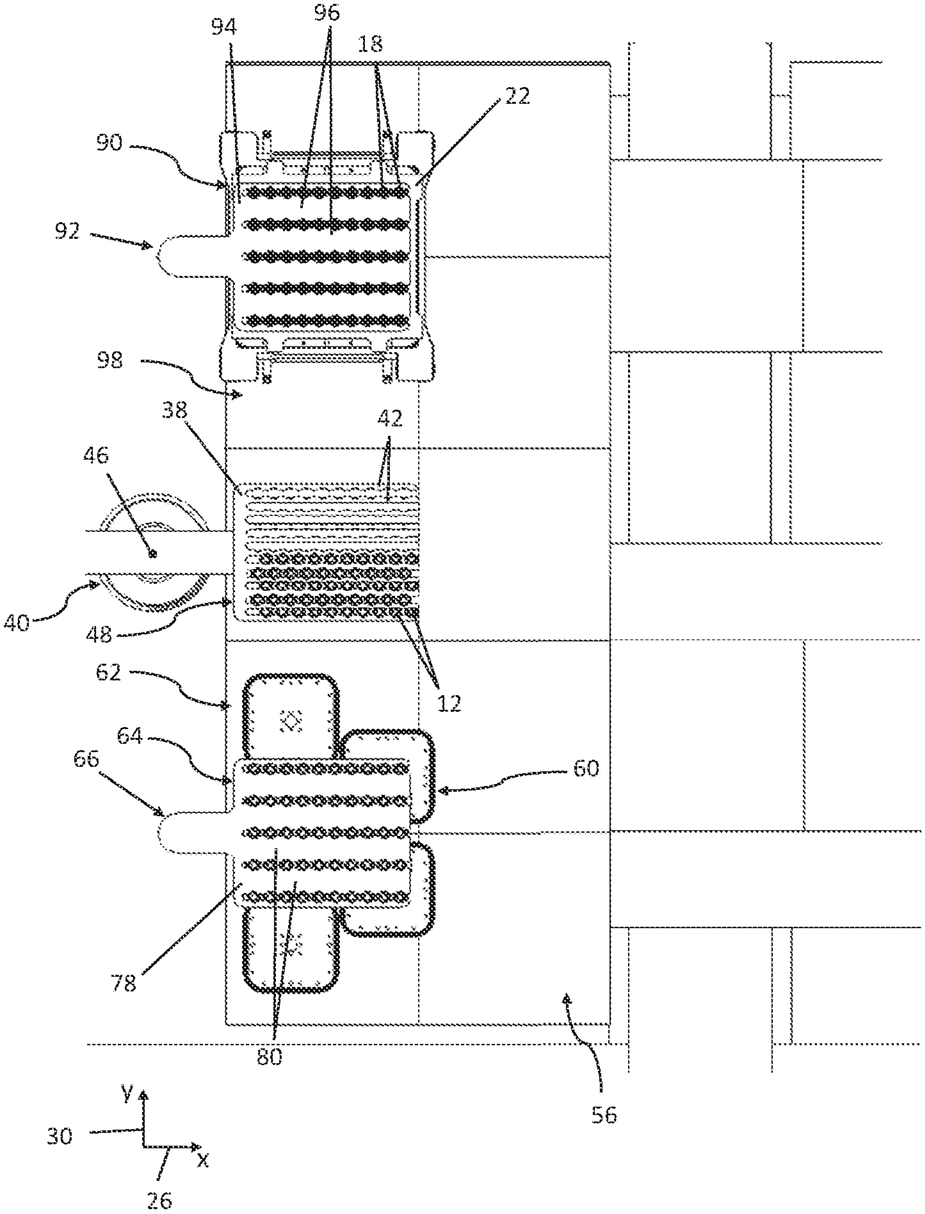

A first holding means 38 of a conversion device 40 is provided for extracting the unfilled receptacles 12 from the stock storage device 14 (see FIG. 1 and also, for example, FIG. 7). The first holding means 38 comprises prongs 42 arranged in comb-like manner and in accordance with the delivery configuration, with clear interspaces being formed between adjacent prongs 42. The arrangement of the prongs 42 corresponding to the delivery configuration is accompanied by the fact that adjacent interspaces have a distance 44 from each other that corresponds to the first distance 32 of the unfilled receptacles 12 in the stock storage device 14. The width of the individual interspaces in the first holding means 38 is in particular matched to a width of the receptacles 12, 18, the width of a interspace being preferably slightly greater than the width or a diameter of the receptacles 12, 18.

For the purpose of transferring the unfilled receptacles 12 to the first holding means 38, the stock storage device 14 is brought into the vicinity of the first holding means 38 by means of the articulated arm robot 34, such that the unfilled receptacles 12 are aligned relative to the prongs 42, or to the interspaces. With a movement of the articulated arm robot 34 in the x-direction 26, the unfilled receptacles 12 are pushed into the respective interspaces of the first holding means 38, with the part of the length of an unfilled receptacle 12 that protrudes upward over the edge of the stock storage device 14 being in each case received in one of the interspaces.

The arrangement of the unfilled receptacles 12 in the delivery configuration is maintained during the transfer to the conversion device 40, such that, in particular, exactly one sub-quantity 24 of the unfilled receptacles 12 is accommodated in exactly one interspace.

The conversion device 40 can be moved along a lifting axis that is perpendicular to the bottom surface of the stock storage device 14. This movement capability makes it possible to remove the unfilled receptacles 12 from the stock storage device 14 by means of a lifting movement of the conversion device 40. The unfilled receptacles 12 in this case are supported by their container collar on the prongs 42 and are held suspended in the holding means 38.

The conversion device 40 is also rotatable about an axis of rotation 46, and by means of a 180° rotation supplies the unfilled receptacles 12 held in the first holding means 38 to a conversion area 48 of the receptacle grouping system 10.

The conversion device 40 preferably also comprises a further first holding means 50, such that, when the first holding means 38 is arranged in the conversion area 48, the further first holding means 50 is arranged in the working space 36 of the articulated arm robot 34.

Figure 2:
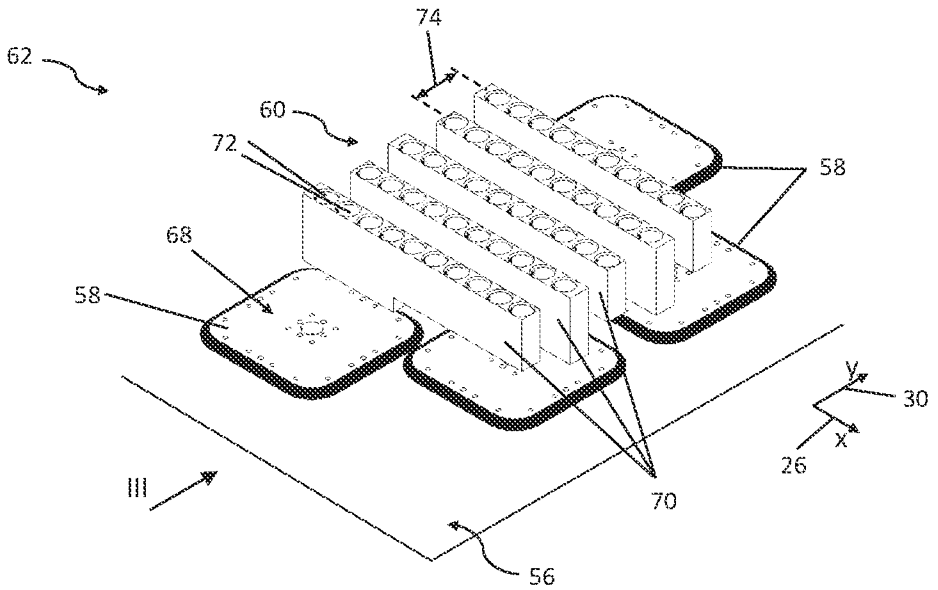
FIG. 2 shows a perspective view of an adaptation area of the receptacle grouping system, with a plurality of movers having respective receiving means for receiving sub-quantities of the receptacles.
Figure 3:
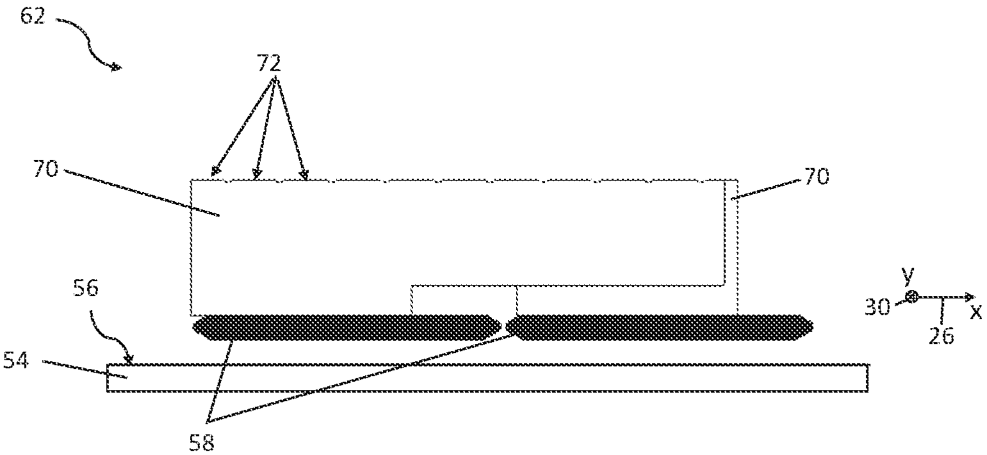
FIG. 3 shows a side view of the adaptation area along a direction of view denoted by III in FIG. 2.

In the conversion area 48 of the receptacle grouping system 10, the unfilled receptacles 12 are held above an upper side 52 of at least one stator 54 in the first holding means 38 of the conversion device 40, see FIGS. 1, 2 and 3. The upper side 52 of the at least one stator 54 forms a lower delimitation of the conversion area 48.

The receptacle grouping system 10 has a drive surface 56 for arranging the movers, described below. The drive surface is formed, for example, by the upper side of a single stator 54. It is also possible, however, for the upper side of the stator 54 to form only a part of the drive surface 56. In this case, further parts of the drive surface 56 are formed by respective upper sides of further stators, for example by a further stator 55 that is adjacent to the stator 54.

A plurality of movers 58 electromagnetically coupled to the stators 54, 55 are arranged on the drive surface 56, with permanent magnets arranged within the movers 58 acting in combination with energized coils of the stators 54, 55, in a manner known per se, and holding the movers 58 in a floating state above the drive surface 56.

In the floating state, the movers 58 are movable over the extent of the drive surface 56. During operation of the receptacle grouping system 10, the movers 58 form a mover group 60 comprising at least two movers 58, for example five movers 58. In particular, the number of movers 58 corresponds to a number of rows of receptacle-carrier receivers 86 of the receptacle carrier 22.

In the receptacle grouping system 10, the movers 58 serve, inter alia, to transport the receptacles 12, 18 across the drive surface 56. In particular, the movers 58 transport the unfilled receptacles 12 from the conversion area 48, through a first adaptation area 62, into a first loading area 64.

There is a first loading device 66 arranged in the first loading area 64. The first loading device 66 serves, in particular, to load the receptacle carrier 22 with unfilled receptacles 12.

As explained above, it is necessary for the unfilled receptacles 12 to be arranged in the machine configuration in order to load the receptacle carrier 22. The changing of the configuration of the unfilled receptacles 12 from their delivery configuration to the machine configuration is effected while the unfilled receptacles 12 are being transported by means of the movers 58 in the first adaptation area 62.

For this purpose, there is a receiving means 70 arranged on a side 68 of each mover 58 of the mover group 60 that faces away from the drive surface 56, see FIG. 2 and FIG. 3.

The receiving means 70 of different movers 58 preferably extend parallel to each other, for example in the x-direction 26. The receiving means 70 each have a plurality of separate receivers 72 for receiving one of the receptacles 12, 18 in each case. The number of receivers 72 of a receiving means 70 of a mover 58 preferably corresponds in this case to the number of receptacles of one of the sub-quantities 24, 25 of the unfilled receptacles 12.

The position and orientation of the receiving means 70 relative to each other can be set by controlling the position and orientation of the movers 58 of the mover group 60. In particular, the movers 58 maybe arranged in such a way that the arrangement of the receivers 72 of the receiving means 70 of the movers 58 of the mover group 60 corresponds to the arrangement of the unfilled receptacles 12 in the delivery configuration, see FIG. 4. The receivers 72 of the receiving means 70 have a distance 74 from each other (in y-direction 30) that corresponds to the first distance 32. The receivers 72 of mutually adjacent receiving means 70 are offset from each other in the x-direction 26, this offset corresponding to any offset 28 of unfilled receptacles 12 in the stock storage device 14, or to the offset of the arrangement of unfilled receptacles 12 on the first holding means 38.

The movers 58 of the mover group 60 are aligned such that the receivers 72 of the receiving means 70 are arranged beneath the unfilled receptacles 12 held in the first holding means 38. The unfilled receptacles 12 are then inserted into the receivers 72 by lowering the conversion device 40, and received in them, see FIG. 6.

Each of the movers 58 receives one of the sub-quantities 24, 25 of the unfilled receptacles 12. The mover group 60 is thus able to receive a number of sub-quantities of the receptacles 12 corresponding to the number of movers 58 of the mover group 60. It is possible for a remaining quantity of receptacles 12 to remain initially in the first holding means 38 of the conversion device 40.

In order to guide the unfilled receptacles 12, received in the receiving means 70, out of the first holding means 38, the mover group 60 moves with its movers 58, in a direction parallel to the prongs 42, out of the conversion area 48, the unfilled receptacles 12 received in the receiving means 70 being removed from the interspaces between the prongs 42.

The unfilled receptacles 12 are then transported through the first adaptation area 62. In the first adaptation area 62, the position and orientation of the movers 58 within the mover group 60 alters in such a way that the arrangement of the unfilled receptacles 12 in the receivers 72 of the receiving means 70 is converted from the delivery configuration to the machine configuration, see FIGS. 4 and 5.

The machine configuration differs from the delivery configuration by, in particular, an increased second distance 76 between the receptacles 12, 18 compared to the first distance 32 and the distance 74. The second distance 76 is specific to the machine configuration. Any offset 28 of the delivery configuration is preferably removed, i.e. reduced to “zero”.

As soon as the unfilled receptacles 12 are arranged in the machine configuration, they can be transferred in the first loading area 64 from the receiving means 70 to the first loading device 66.

For this purpose, the first loading device 66 has a second holding means 78 having prongs 80 arranged in a comb-like manner and in accordance with the machine configuration, with free interspaces being realized in each case between adjacent prongs 80. The arrangement of the prongs 80 corresponding to the machine configuration is accompanied by the fact that adjacent interspaces have a distance 82 from each other that corresponds to the second distance 76 of the unfilled receptacles 12 arranged in the receiving means 70.

The first loading device 66 is movable along a lifting axis. It is therefore possible for the unfilled receptacles 12, arranged in the receiving means 70, to be aligned relative to the interspaces of the second holding means 78 by a combination of a movement of the first loading device 66 along the lifting axis and a movement to align the mover group 60 in a plane parallel to the drive surface 56. In this way, when the mover group 60 moves into the first loading area 64, the individual sub-quantities 24, 25 of the unfilled receptacles 12 are each received in one of the interspaces, see FIG. 7.

By means of a lifting movement of the first loading device 66, the unfilled receptacles 12 are removed from the receiving means 70 by the prongs 80 engaging under the container collars of the receptacles 12. The unfilled receptacles 12 are thus supported on the prongs 80 and are held suspended in the second holding means 78.

Figure 8:
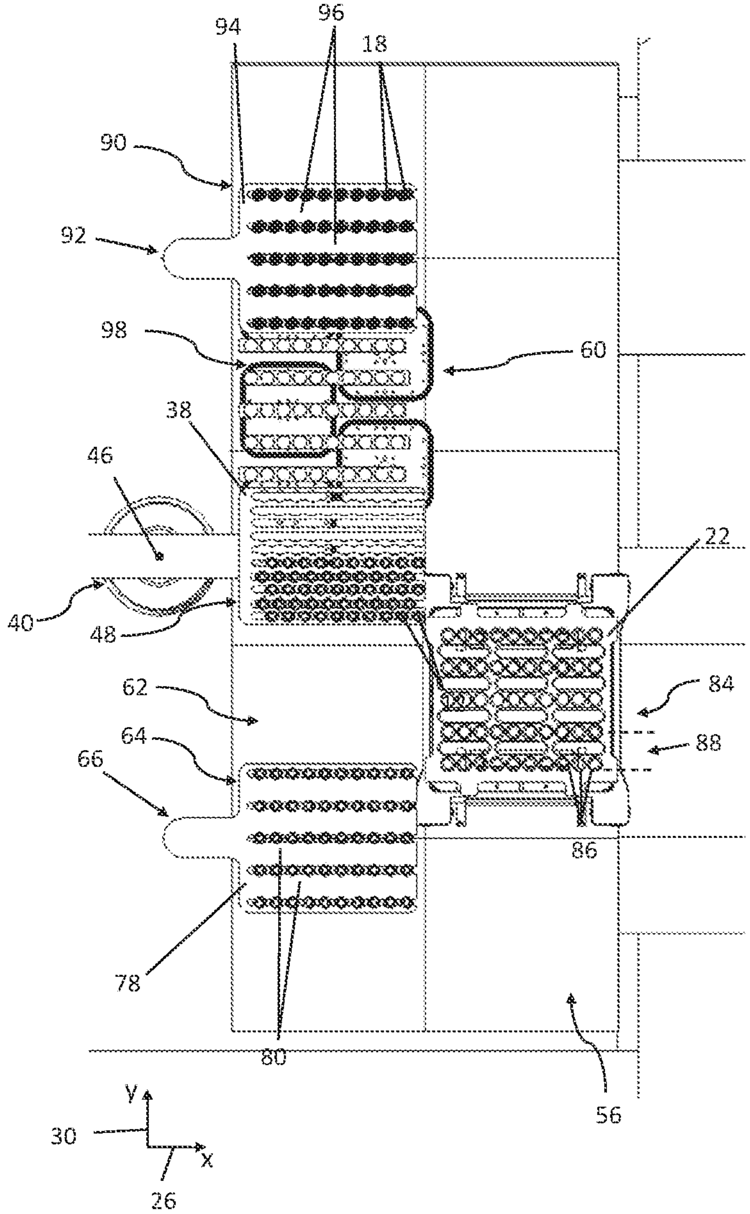

The mover group 58 then moves out of the first loading area 64. This frees the first loading area 64 for the receptacle carrier 22 to enter, see FIG. 8.

The receptacle carrier 22 is part of a transport device 83, and is arranged on a side of a transport mover 84 that faces away from the drive surface 56, which transport mover is also held suspended above the drive surface 56 in a manner known per se and can also be moved over the drive surface 56.

The receptacle carrier 22 has a plurality of receptacle-carrier receivers 86, each receptacle-carrier receiver 86 being able to receive respectively one receptacle 12, 18. The receptacle-carrier receivers 86 are arranged in an arrangement corresponding to the machine configuration. This means that mutually adjacent rows of receptacle-carrier receivers 86 have a “second” spacing 88 relative to each other that corresponds to the spacing 82 of the unfilled receptacles 12 in the first loading device 66.

Figure 9:
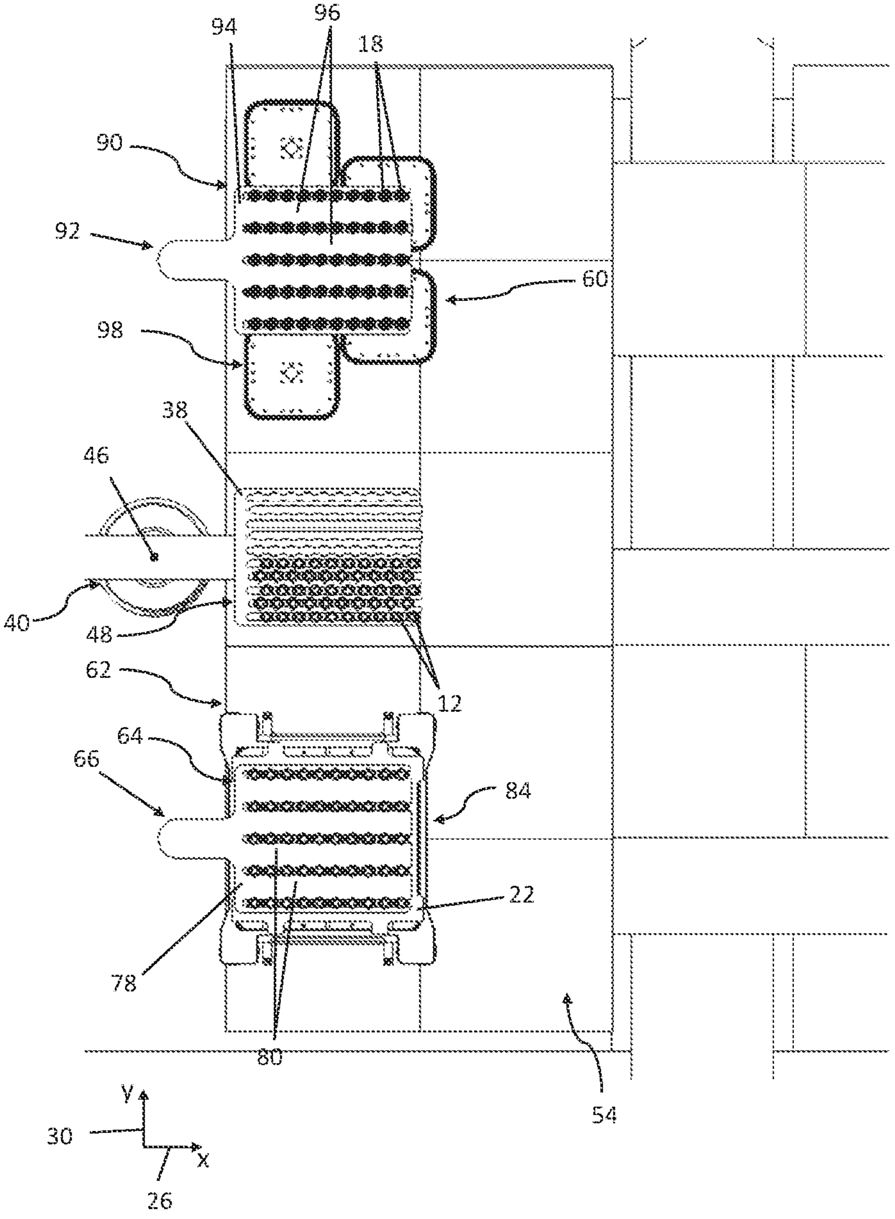

When the receptacle carrier 22 is arranged in the first loading area 64, the unfilled receptacles 12 held in the second holding means 78 are loaded into the receptacle-carrier receivers 86 by lowering of the first loading device 66, see FIG. 9.

Figure 10:
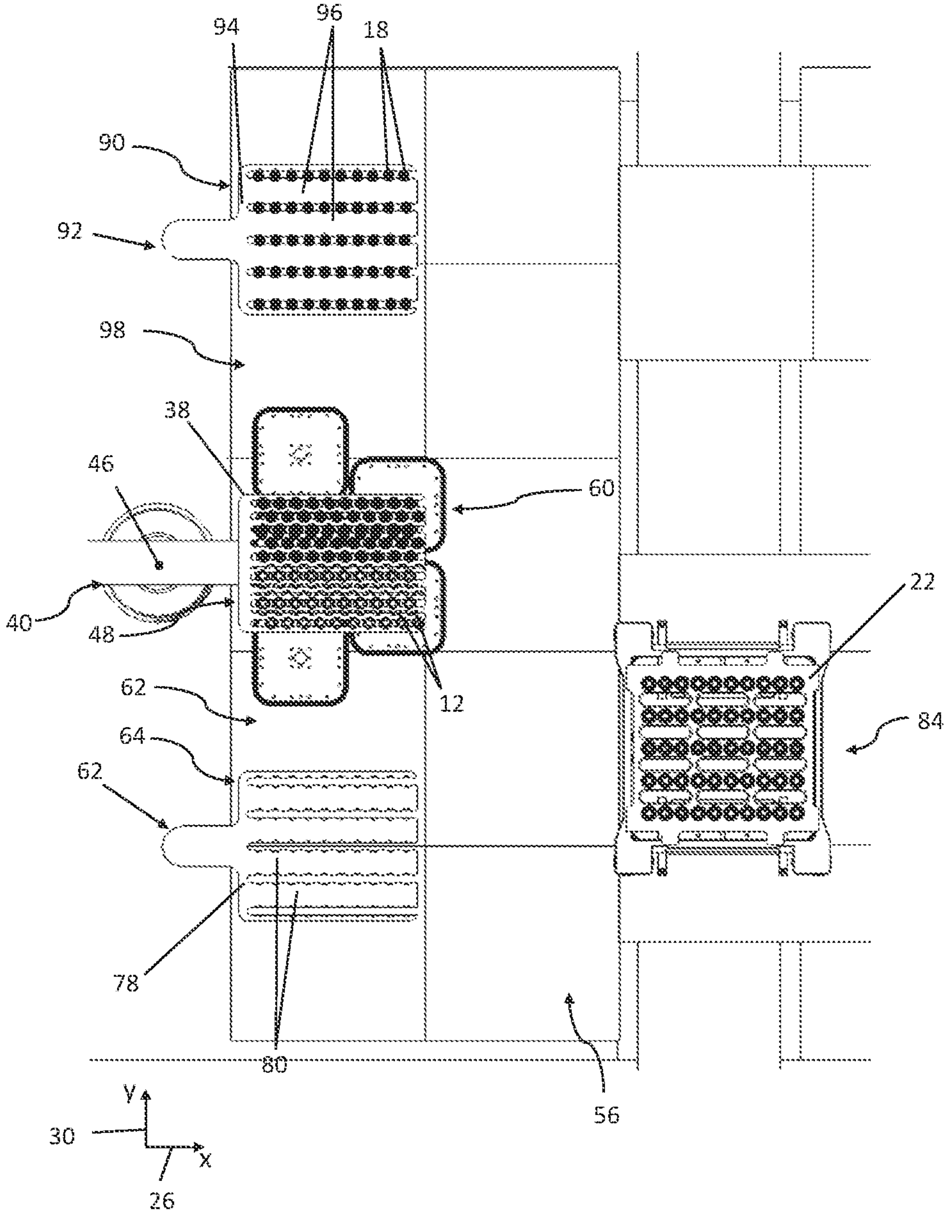

The unfilled receptacles 12 are then removed from the second holding means 78. For this purpose, the receptacle carrier 22 is moved away from the second holding means 78, this being in a direction parallel to the extent of the prongs 80 of the second holding means 78, see FIG. 10.

The receptacle carrier 22 then transports the unfilled receptacles 12 along the transport path to the filling device 16, at or in which the unfilled receptacles 12 are filled, thus forming filled receptacles 18.

Figure 6:
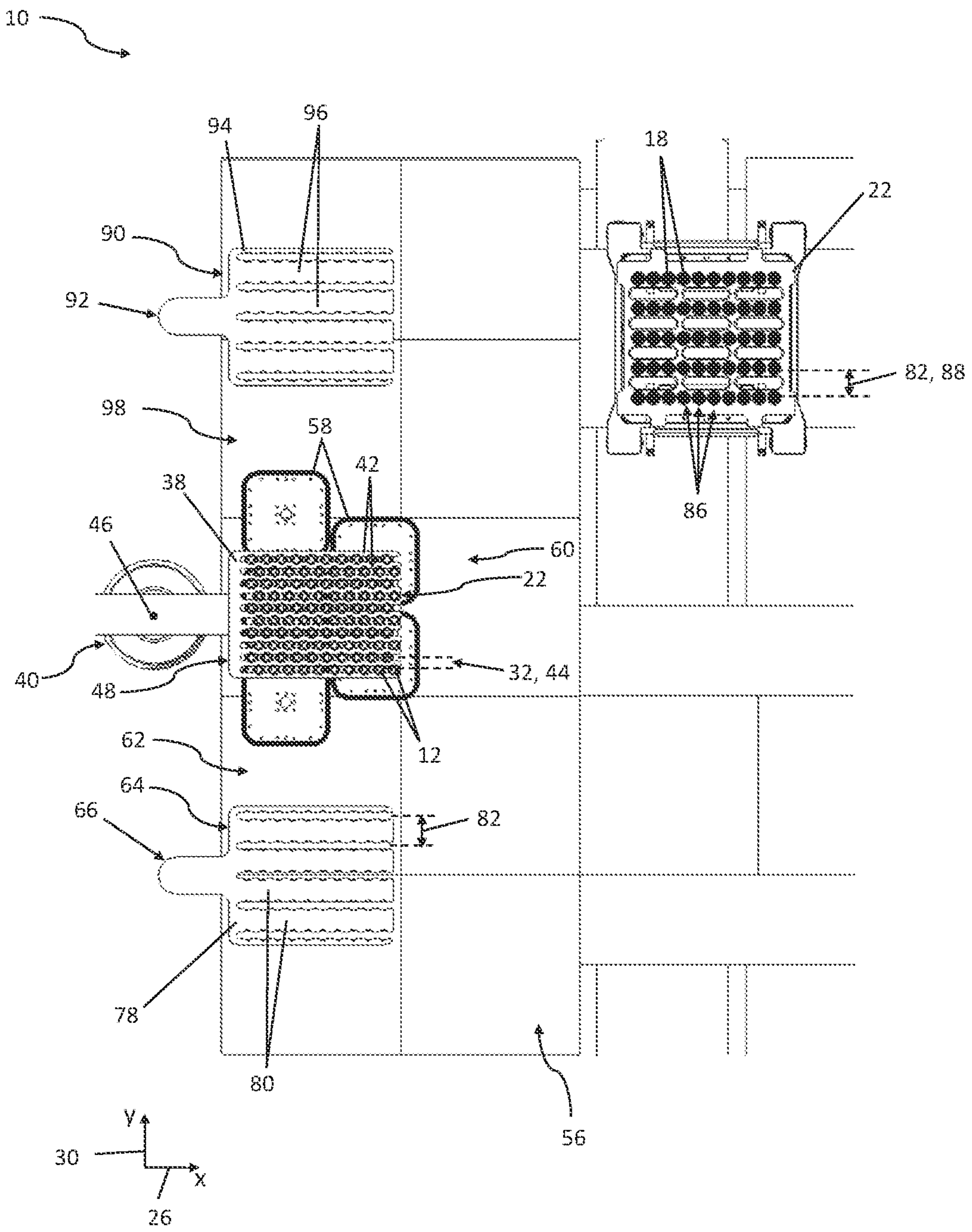
FIGS. 6 to 10 show an enlarged representation of a section, denoted by VI in FIG. 1, during various phases of the operation of the receptacle grouping system.

The receptacle carrier 22 then transports the filled receptacles 18 to a second loading area 90, see FIG. 6.

There is a second loading device 92 arranged in the second loading area 90, the second loading device 92 having a third holding means 94 comprising comb-like prongs 96 arranged in accordance with the machine configuration. The second loading device 92 is movable along a lifting axis that is perpendicular to the drive surface 56.

In the second loading area, the filled receptacles 18 are transferred from the receptacle carrier 22 to the third holding means 94 of the second loading device 92. The prongs 96 of the third holding means 94 engage under the container collars of the filled receptacles 18 and lift the filled receptacles 18 out of the receptacle-carrier receivers 86, see FIG. 7.

The receptacle carrier 22 then moves out of the second loading area 90, for example in the direction of the first loading area 64 (in particular in order to load new, unfilled receptacles 12 there).

After the receptacle carrier 22 has vacated the second loading area, the mover group 60 moves in the direction of the second loading area 90. There, the filled receptacles 18 arranged in the second loading area 90 are transferred from the third holding means 94 downward into the receiving means 70 of the movers 58 through lowering of the second loading device 92.

Figure 4:
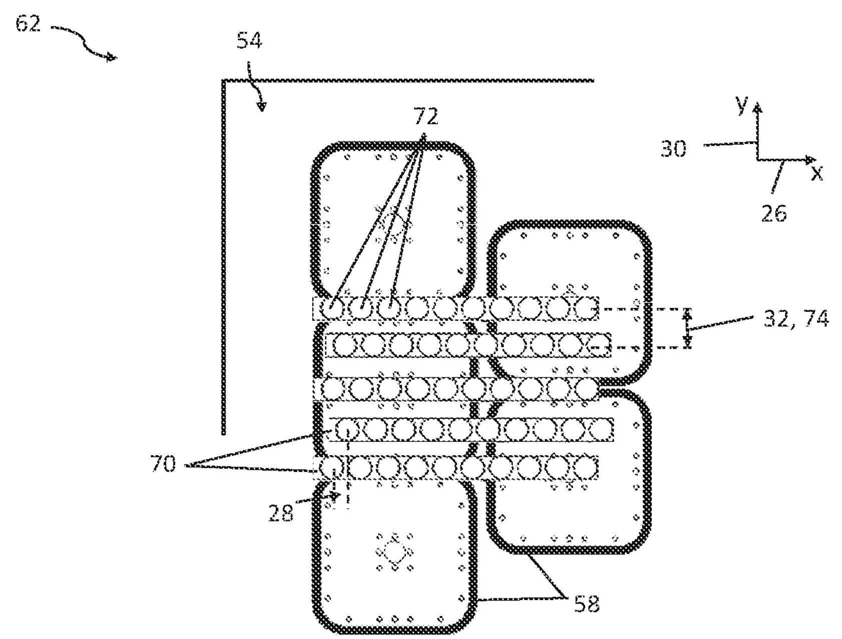
FIG. 4 shows a top view of the adaptation area, the movers having a spacing that is associated with a delivery configuration of the receptacles.
Figure 5:
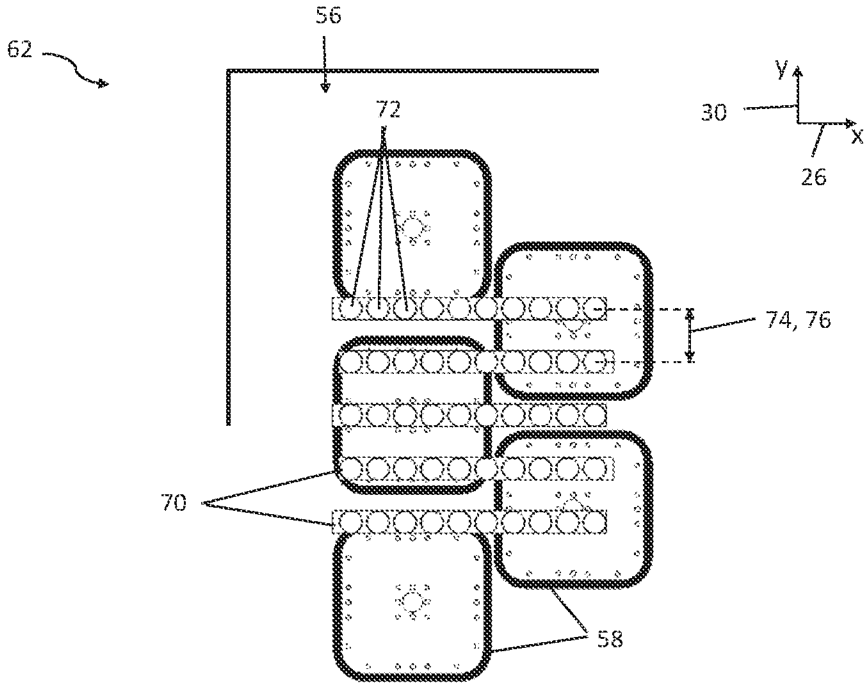
FIG. 5 shows a top view of the adaptation area, the movers having a spacing that is associated with a machine configuration of the receptacles.

The filled receptacles 18 received in the receiving means 70 are then removed from the third holding means 94 by means of the mover group 60, and transported through a second adaptation area 98 into the conversion area 48. During the movement through the second adaptation area 98, the arrangement and position of the movers 58 is altered in such a way that the configuration of the filled receptacles 18 is altered from the machine configuration (FIG. 5) to the delivery configuration (FIG. 4).

In the conversion area 48, the filled receptacles 18 are transferred to the first holding means 38 of the conversion device 40. For this purpose, the prongs 42 engage under the container collars of the filled receptacles 18 and lift the filled receptacles 18 out of the receiving means 70.

As soon as there are exclusively filled receptacles 18 received in the first holding means 38, these filled receptacles 18 are discharged from the conversion area 48 by means of a 180° rotation of the conversion device 40 about the axis of rotation 46, and can be transferred to the stock container 20.

In order to realize a receptacle grouping system 10 that is as efficient as possible, while the receptacles 12 are being filled at or in the filling device 16, the second holding means 50 of the conversion device 40 may already be being loaded with new, unfilled receptacles 12 from the receptacle stock 15.

It is also possible to provide only a single loading area 64, which is spaced apart from the conversion area 40 by an adaptation area 62 assigned to this loading area.

What is claimed is:

1. A receptacle grouping system, comprising:

a stock storage device, receptacles being arranged in the stock storage device in a delivery configuration in which different sub-quantities of the receptacles have a first distance from each other that corresponds to the delivery configuration, the receptacles including filled receptacles and unfilled receptacles, a transport device for transporting the receptacles, wherein the receptacles are arranged in a receptacle carrier, along a transport path, the receptacles being arranged in the receptacle carrier in a machine configuration in which the different sub-quantities of receptacles have a second distance from each other that corresponds to the machine configuration and that is different from the first distance corresponding to the delivery configuration, wherein, as viewed along the transport path, at least one loading area is provided, the at least one loading area having a loading device configured for at least one selected from the group consisting of (i) loading the receptacle carrier with the unfilled receptacles and (ii) unloading the filled receptacles from the receptacle carrier, wherein the receptacle grouping system has a conversion device configured for at least one selected from the group consisting of (i) supplying the unfilled receptacles from a receptacle stock into a conversion area and (ii) discharging the filled receptacles from the conversion area into a stock container, wherein the receptacles are arranged in the conversion area in the delivery configuration, wherein the conversion area and the at least one loading area are spaced apart from each other across at least one adaptation area, wherein the configuration of the receptacles is alterable, between the delivery configuration and the machine configuration, wherein, in the at least one adaptation area, at least one stator and at least two movers are provided, the at least one stator and the at least two movers being electromagnetically coupled to the stator, wherein the movers are drivable to move independently of each other relative to a drive surface, wherein a receiving means for receiving one of the sub-quantities of the receptacles is provided, the receiving means being arranged on a respective upper side of a mover, and wherein the receptacles being are selectively convertible to the machine configuration or to the delivery configuration by alteration of the distance between the movers.

2. The receptacle grouping system according to claim 1, wherein the receiving means together have a total number of receivers, each of which serves to receive a receptacle, and wherein this total number is at least as great as a total number of receptacle-carrier receivers of the receptacle carrier, the receptacle-carrier receivers each serving to receive one receptacle.

3. The receptacle grouping system according to claim 1, wherein the transport device comprises a transport mover that serves to transport the receptacle carrier along the transport path and that are configured to be driven by the at least one stator or by a further stator.

4. The receptacle grouping system according to claim 1, wherein the transport device comprises a plurality of receptacle carriers.

5. The receptacle grouping system according to claim 1, wherein at least one selected from the group consisting of the conversion device and the loading device is drivable along a lifting axis that is perpendicular to the drive surface.

6. The receptacle grouping system according to claim 1, wherein the conversion device has at least one first holding means having prongs arranged in accordance with the delivery configuration, the prongs being configured to receive respectively one of the sub-quantities of the receptacles.

7. The receptacle grouping system according to claim 6, wherein the conversion device has two first holding means, and wherein the conversion device is configured to be driven to rotate about an axis of rotation that is perpendicular to the drive surface.

8. The receptacle grouping system according to claim 1, wherein the loading device has a second holding means having prongs arranged in accordance with the machine configuration, the prongs being configured to receive respectively one of the sub-quantities of the receptacles.

9. The receptacle grouping system according to claim 1, wherein, as viewed along the transport path, two loading areas are provided, a first loading area being spaced apart from the conversion area across a first adaptation area, and a second loading area being spaced apart from the conversion area across a second adaptation area.

10. The receptacle grouping system according to claim 9, wherein the receptacles are configured to be converted in the first adaptation area from the delivery configuration to the machine configuration, and that wherein the receptacles are configured to be converted in the second adaptation area from the machine configuration to the delivery configuration.

11. A method for operating a receptacle grouping system according to claim 1, the method comprising:

a) supplying the unfilled receptacles and stocking the unfilled receptacles in the conversion area, b) receiving at least two sub-quantities of the unfilled receptacles in different receiving means of different movers, c) moving the movers through the at least one adaptation area, the distance between the movers being altered, as a result of which the receptacles are converted from the delivery configuration to the machine configuration, d) entering the movers into the at least one loading area, removing the unfilled receptacles from the receiving means of the movers and transferring them to the loading device, e) exiting the movers from the at least one loading area, f) entering the receptacle carrier into the at least one loading area and loading the receptacle carrier with the unfilled receptacles, g) transporting the unfilled receptacles along the transport path and filling the receptacles, h) entering the receptacle carrier into the at least one loading area, unloading the filled receptacles from the receptacle carrier and transferring them to the loading device, i) exiting the receptacle carrier from the at least one loading area-, j) entering the movers into the at least one loading area, receiving the filled receptacles into the receiving means of the movers, k) moving the movers through the at least one adaptation area, the distance between the movers being altered, as a result of which the filled receptacles are converted from the machine configuration to the delivery configuration, l) Entering the movers into the conversion area, removing the filled receptacles from the receiving means of the movers and transferring them into the conversion area, m) discharging the filled receptacles from the conversion area.

12. The method according to claim 11, wherein—according to c)—the unfilled receptacles are converted in a first adaptation area from the delivery configuration to the machine configuration and that simultaneously—according to h)—the filled receptacles are unloaded from the receptacle carrier and transferred into a second loading area.

* * * * *